(12) United States Patent
Matsushita et al.

(10) Patent No.: US 11,760,681 B2
(45) Date of Patent: Sep. 19, 2023

(54) CHALCOGENIDE GLASS MATERIAL

(71) Applicant: NIPPON ELECTRIC GLASS CO., LTD., Otsu (JP)

(72) Inventors: Yoshimasa Matsushita, Otsu (JP); Fumio Sato, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 17/528,224

(22) Filed: Nov. 17, 2021

(65) Prior Publication Data

US 2022/0073400 A1    Mar. 10, 2022

Related U.S. Application Data

(62) Division of application No. 16/630,880, filed as application No. PCT/JP2018/024619 on Jun. 28, 2018.

(30) Foreign Application Priority Data

Aug. 2, 2017   (JP) .................................. 2017-149788

(51) Int. Cl.
| | |
|---|---|
| *B32B 15/04* | (2006.01) |
| *B32B 17/06* | (2006.01) |
| *C03B 23/047* | (2006.01) |
| *C03C 3/32* | (2006.01) |
| *G01J 5/08* | (2022.01) |

(52) U.S. Cl.
CPC ............ *C03B 23/047* (2013.01); *C03C 3/321* (2013.01); *G01J 5/08* (2013.01)

(58) Field of Classification Search
CPC ............................. C03C 3/321; C03B 23/047

USPC ......................................................... 428/426
See application file for complete search history.

(56) References Cited

U.S. PATENT DOCUMENTS

| | | | |
|---|---|---|---|
| 5,160,521 A * | 11/1992 | Tran .................. | C03B 37/01271 65/41 |
| 6,015,765 A * | 1/2000 | Harbison ................ | C03C 3/323 501/40 |
| 6,405,565 B1 * | 6/2002 | Aitken .................... | C03C 13/00 432/106 |

(Continued)

FOREIGN PATENT DOCUMENTS

| | | |
|---|---|---|
| CN | 1736917 A | 2/2006 |
| CN | 101387737 A | 3/2009 |

(Continued)

OTHER PUBLICATIONS

Matsushita et al., "Chalcogenide Glass Material", U.S. Appl. No. 16/630,880, filed Jan. 14, 2020.

(Continued)

*Primary Examiner* — Lauren R Colgan
(74) *Attorney, Agent, or Firm* — KEATING AND BENNETT, LLP

(57) ABSTRACT

Provided is a small-diameter chalcogenide glass material having excellent weather resistance and mechanical strength and being suitable as an optical element for an infrared sensor. The chalcogenide glass material has an unpolished side surface, a pillar shape with a diameter of 15 mm or less, and a composition of, in terms of % by mole, 40 to 90% S+Se+Te and an inside of the glass material is free of stria with a length of 500 μm or more.

4 Claims, 1 Drawing Sheet

(56) References Cited

U.S. PATENT DOCUMENTS

| | | | |
|---|---|---|---|
| 10,131,568 B2* | 11/2018 | Nguyen | C03B 5/187 |
| 10,450,214 B2* | 10/2019 | McEnroe | B32B 1/08 |
| 2009/0067041 A1 | 3/2009 | Izumi | |
| 2010/0022378 A1* | 1/2010 | Nguyen | C03C 3/32 |
| | | | 203/29 |
| 2010/0067862 A1* | 3/2010 | Nguyen | C03B 37/01265 |
| | | | 423/508 |
| 2010/0285946 A1* | 11/2010 | Tani | C03C 4/10 |
| | | | 501/40 |
| 2011/0274924 A1* | 11/2011 | Jiang | C03C 13/04 |
| | | | 428/375 |
| 2015/0344342 A1* | 12/2015 | Nguyen | C03B 5/16 |
| | | | 501/40 |
| 2016/0257593 A1* | 9/2016 | Nguyen | C03B 5/16 |
| 2016/0377766 A1* | 12/2016 | Carlie | C03C 3/321 |
| | | | 359/350 |
| 2018/0257977 A1* | 9/2018 | Nagashima | C03C 3/32 |
| 2019/0292094 A1* | 9/2019 | Schultheis | C03C 3/32 |

FOREIGN PATENT DOCUMENTS

| | | |
|---|---|---|
| CN | 101891386 A | 11/2010 |
| CN | 104355538 A | 2/2015 |
| CN | 105110634 A | 12/2015 |

OTHER PUBLICATIONS

Official Communication issued in corresponding Chinese Patent Application No. 201880050231.X, dated May 11, 2022.

Official Communication issued in corresponding Chinese Patent Application No. 201880050231.X, dated Sep. 24, 2021.

Xu, "Preparation and Performance Study of Sulfide Glasses for Infrared Fiber Materials", China Master's Theses Full-text Database (CMFD), Engineering and Science and Technology vol. 1, Issue 8, Aug. 15, 2010, 3 pages.

Lemay, Glass Translation Series, vol. 2, Shanghai Translators for Science and Technology, Mar. 31, 1964, 3 pages.

* cited by examiner

[FIG. 1]
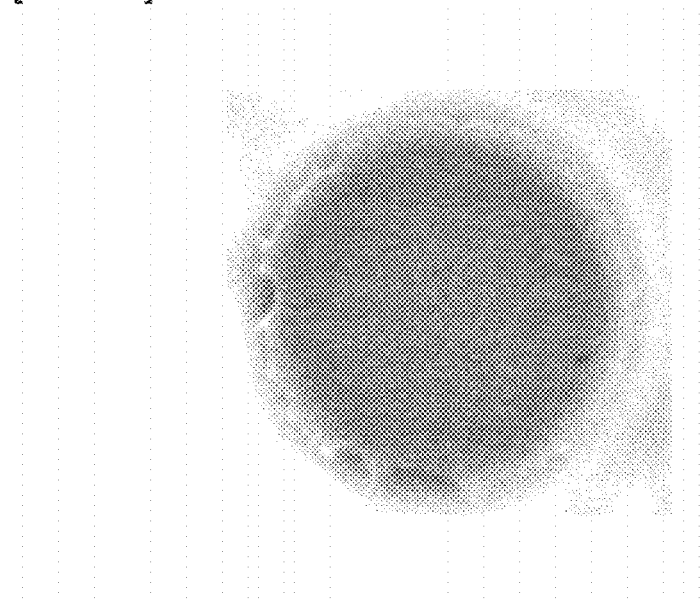
[FIG. 2]
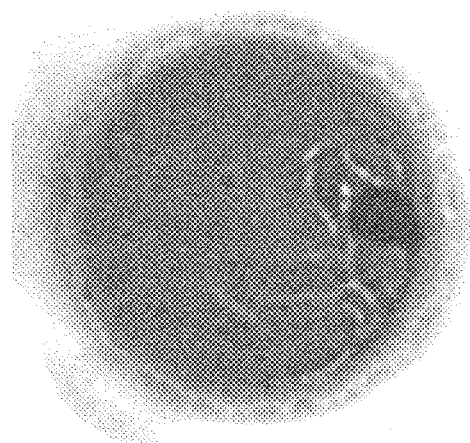

CHALCOGENIDE GLASS MATERIAL

TECHNICAL FIELD

The present invention relates to chalcogenide glass materials for use in infrared sensors, infrared cameras, and so on.

BACKGROUND ART

Vehicle-mounted night vision devices, security systems, and the like include infrared sensors for use to detect living bodies at night. To sense infrared rays with wavelengths of about 8 to 14 μm emitted from living bodies, such an infrared sensor is provided, in front of the sensor part, with an optical element, such as a filter or a lens, capable of transmitting infrared rays in the above wavelength range.

Examples of a material for the optical element as described above include Ge, Zn, and Se. These materials are crystalline bodies and therefore have poor processability, which makes them difficult to process into complicated shapes, such as an aspheric lens. For this reason, these materials have the problem of making mass production of the above optical element difficult and also have the problem of making size reduction of the infrared sensor difficult.

To cope with the above, chalcogenide glasses are proposed as vitreous materials that can transmit infrared rays with wavelengths of about 8 to 14 μm and are relatively easily processable (see, for example, Patent Literature 1).

Recently, a small-diameter chalcogenide glass has been desired for the purpose of further size reduction of infrared sensors.

CITATION LIST

Patent Literature

[PTL 1] JP-A-2009-161374

SUMMARY OF INVENTION

Technical Problem

However, a small-diameter chalcogenide glass has poor weather resistance and mechanical strength. Furthermore, when the chalcogenide glass is used as an optical element for an infrared sensor, there arises a problem that an image is distorted or disturbed.

The present invention has been made in view of the above situations and, therefore, has an object of providing a small-diameter chalcogenide glass material having excellent weather resistance and mechanical strength and being suitable as an optical element for an infrared sensor.

Solution to Problem

The inventors have conducted various studies, consequently have made the following findings, and have proposed the present invention based on the findings. A small-diameter chalcogenide glass material is typically produced by cutting and polishing. When the side surface of the chalcogenide glass is polished, microscopic polishing flaws are formed in the side surface, so that the specific surface area of the side surface increases. As a result, the area of contact of the chalcogenide glass with outside air increases and, therefore, the weather resistance becomes likely to decrease. Furthermore, small defects called Griffith flaws are produced by the polishing process, so that the mechanical strength becomes likely to decrease. Meanwhile, when producing a small-diameter chalcogenide glass material, striae are likely to be produced in the glass material. If there is a large-sized stria in the chalcogenide glass material, images from the infrared sensor are likely to be distorted or disturbed.

A chalcogenide glass material according to the present invention is a chalcogenide glass material having an unpolished side surface, a pillar shape with a diameter of 15 mm or less, and a composition of, in terms of % by mole, 40 to 90% S+Se+Te, an inside of the glass material being free of stria with a length of 500 μm or more.

Since the side surface is unpolished, the specific surface area is reduced, which makes the weather resistance likely to be increased, and no Griffith flaw decreasing the mechanical strength is produced, which makes the mechanical strength likely to be increased. Furthermore, since there is no stria with a length of 500 μm or more in the glass material, images from an infrared sensor are less likely to be distorted or disturbed.

In the chalcogenide glass material according to the present invention, the side surface is preferably a fire-polished surface. Since the side surface is formed into a fire-polished surface, the specific surface area is further reduced, so that the weather resistance and mechanical strength are more likely to be increased.

The chalcogenide glass material according to the present invention preferably contains, in terms of % by mole, over 0 to 50% Ge+Ga+Sb+As.

The chalcogenide glass material according to the present invention preferably contains, in terms of % by mole, 0 to 40% Ge+Ga and 0 to 45% Sb+As.

A method for producing a chalcogenide glass material according to the present invention includes drawing a glass base material containing, in terms of % by mole, 40 to 90% S+Se+Te by a redraw process. Since the glass base material is redrawn, an unpolished, small-diameter chalcogenide glass can be easily obtained.

In the method for producing a chalcogenide glass material according to the present invention, a drawing temperature is preferably equal to or lower than a glass transition point of the chalcogenide glass plus 100° C. Since the drawing temperature is equal to or lower than the glass transition point of the chalcogenide glass plus 100° C., the evaporation of the glass components can be reduced, so that striae are less likely to be produced.

In the method for producing a chalcogenide glass material according to the present invention, the drawing is preferably performed in a vacuum or in an inert atmosphere. Since the drawing is performed in a vacuum or in an inert atmosphere, the evaporation of the glass components can be further reduced, so that striae are even less likely to be produced.

An optical element according to the present invention uses the above-described chalcogenide glass material.

An infrared sensor according to the present invention uses the above-described optical element.

Advantageous Effects of Invention

The present invention enables provision of a small-diameter chalcogenide glass material having excellent weather resistance and mechanical strength and being suitable as an optical element for an infrared sensor.

BRIEF DESCRIPTION OF DRAWINGS

FIG. 1 is a photograph showing the inside of a sample obtained in Example 1.

FIG. 2 is a photograph showing the inside of a sample obtained in Comparative Example 1.

DESCRIPTION OF EMBODIMENTS

A chalcogenide glass material according to the present invention has an unpolished side surface and, particularly, the side surface is preferably a fire-polished surface. If the side surface is polished, the specific surface area of the side surface increases, so that the reaction with oxygen and moisture in the air is promoted, which makes the weather resistance likely to be decreased. Furthermore, small defects called Griffith flaws are produced by the polishing process, so that the mechanical strength is likely to be decreased. If a polishing step is included in the production process, a problem of cost rise also arises.

The chalcogenide glass material according to the present invention has a pillar shape and its diameter is 15 mm or less, preferably 10 mm or less, and particularly preferably 5 mm or less. If the diameter is too large, this makes it difficult to reduce the size of an infrared sensor. Although no particular limitation is placed on the lower limit of the diameter, it is realistically 1 mm or more.

The chalcogenide glass material according to the present invention is free of stria with a length of 500 μm or more. Even if there are striae in the chalcogenide glass material, their lengths are less than 500 μm, preferably 200 μm or less, more preferably 100 μm or less, still more preferably 50 μm or less, and particularly preferably 10 μm or less. By doing so, when the chalcogenide glass material is used as an optical element, the reduction in resolution of an image due to distortion or disturbance can be prevented.

The chalcogenide glass material according to the present invention contains, in terms of % by mole, 40 to 90% S+Se+Te. Reasons why the glass composition is limited as just described will be described below. Note that in the following description of the contents of components "%" refers to "% by mole" unless otherwise specified.

Chalcogen elements, S, Se, and Te, are components for forming the glass network. The content of S+Se+Te (the total amount of S, Se, and Te) is 40 to 90%, preferably 50 to 80%, more preferably 50 to 65%, and particularly preferably 55 to 65%. If the content of S+Se+Te is too small, vitrification becomes difficult. On the other hand, if the content of S+Se+Te is too large, the glass components are likely to evaporate during melting and redrawing, which is likely to cause striae.

The chalcogenide glass material may contain, in addition to the above components, the various components mentioned below.

Ge, Ga, Sb, and As are components that widen the vitrification range and increase the thermal stability of glass. Ge+Ga+Sb+As (the total amount of Ge, Ga, Sb, and As) is preferably over 0 to 50%, more preferably 10 to 45%, still more preferably 15 to 43%, yet still more preferably 20 to 43%, even still more preferably 25 to 43%, and particularly preferably 30 to 43%. If the content of Ge+Ga+Sb+As is too large, vitrification becomes difficult.

Ge+Ga (the total amount of Ge and Ga) is preferably 0 to 40%, more preferably 2 to 35%, still more preferably 4 to 33%, yet still more preferably 4 to 30%, even still more preferably 4 to 28%, and particularly preferably 4 to 25%. Sb+As (the total amount of Sb and As) is preferably 0 to 45%, more preferably 5 to 40%, still more preferably 10 to 35%, yet still more preferably 15 to 35%, and particularly preferably 20 to 35%.

The chalcogenide glass material having the above composition is likely to exhibit a glass transition point of 100 to 400° C., 120 to 380° C., or particularly 140 to 360° C.

Next, a description will be given of a method for producing a chalcogenide glass material according to the present invention. The chalcogenide glass material according to the present invention can be produced by Production Method 1 below.

(Production Method 1)

Raw materials are mixed to give the above-described glass composition, thus obtaining a raw material batch. Next, a quartz glass ampoule is evacuated with the application of heat, the raw material batch is then put into the quartz glass ampoule, and the quartz glass ampoule is sealed with an oxygen burner while being evacuated. Note that the diameter of the quartz glass ampoule is preferably 15 mm or more, more preferably 17 mm or more, and particularly preferably 20 mm or more. If the diameter of the quartz glass ampoule is too small, a melt is difficult to move in the quartz glass ampoule, so that a stirring effect cannot sufficiently be obtained and striae are therefore likely to be produced.

Next, the sealed quartz glass ampoule is raised in temperature to 650 to 1000° C. at a rate of 10° C. to 20° C./hour in a melting furnace and then held for six to twelve hours. During the holding time, the quartz glass ampoule is turned upside down as necessary to stir the melt.

Subsequently, the quartz glass ampoule is taken out of the melting furnace and rapidly cooled to room temperature, thus obtaining a glass base material. Thereafter, the quartz glass ampoule is cut and the glass base material is taken out of the ampoule.

When the obtained glass base material is drawn by a redraw process, a pillar-like chalcogenide glass material having a smaller diameter can be obtained. The side surface of the chalcogenide glass material produced by the redraw process is a fire-polished surface, which has excellent weather resistance and mechanical strength.

The drawing temperature is preferably equal to or lower than the glass transition point of the chalcogenide glass material plus 100° C., more preferably equal to or lower than the glass transition point of the chalcogenide glass material plus 80° C., still more preferably equal to or lower than the glass transition point of the chalcogenide glass material plus 60° C., and particularly preferably equal to or lower than the glass transition point of the chalcogenide glass material plus 40° C. If the drawing temperature is too high, the glass components easily evaporate, so that striae are likely to be produced and the refractive index of the inside of the glass material is likely to be uneven. The atmosphere in which the drawing is performed is preferably a vacuum or an inert atmosphere. The preferred inert atmosphere is nitrogen, argon or helium atmosphere. Particularly preferred is a nitrogen atmosphere because of its inexpensiveness. If the drawing is performed without controlling the atmosphere, components in the chalcogenide glass material react with oxygen in the air, so that the evaporation of glass components is promoted. For example, in the case of a sulfide-based chalcogenide glass material containing much sulfur, sulfur in the glass material reacts with oxygen, so that $SO_2$ evaporates from the surface of the glass material. Thus, striae are likely to be produced and the refractive index of the inside of the glass material is likely to be uneven. In addition, the glass material may be oxidized, so that its infrared transparency tends to decrease.

As alternatives to Production method 1, a chalcogenide glass material may be produced by Production Method 2 or 3 below.

(Production Method 2)

Raw materials are mixed to give the above-described glass composition, thus obtaining a raw material batch. Next, a quartz glass ampoule is evacuated with the application of heat, the raw material batch is then put into the quartz glass ampoule, and the quartz glass ampoule is sealed with an oxygen burner while being evacuated. Note that the diameter of the quartz glass ampoule is the same as described above.

Next, the sealed quartz glass ampoule is raised in temperature to 650 to 1000° C. at a rate of 10° C. to 20° C./hour in a melting furnace and then held for six to twelve hours. During the holding time, the quartz glass ampoule is turned upside down as necessary to stir the melt.

Next, the quartz glass ampoule is taken out of the melting furnace and the melt is poured into a mold in an inert atmosphere and rapidly cooled to room temperature, thus obtaining a chalcogenide glass material. Thereafter, the obtained chalcogenide glass material may be drawn by a redraw process. The material for the mold is preferably carbon or quartz glass. If a metallic mold is used, it may react with the melt to form an alloy. Because the diameter of the chalcogenide glass material depends on the inner diameter of the mold, the inner diameter of the mold should be selected according to the diameter of a chalcogenide glass material to be produced.

(Production Method 3)

Raw materials are mixed to give the above-described glass composition, thus obtaining a raw material batch. Next, a quartz glass ampoule is evacuated with the application of heat, the raw material batch is then put into the quartz glass ampoule, and the quartz glass ampoule is sealed with an oxygen burner while being evacuated. The quartz glass ampoule preferably has a shape in which a glass forming portion for glass formation with an inner diameter of 15 mm or less is connected to a stirring portion for stirring with an inner diameter of 15 mm or more. Thus, during stirring, the melt flows into the stirring portion and thus can easily move in the quartz glass ampoule. Note that the inner diameter of the glass forming portion should be selected according to the diameter of a chalcogenide glass material to be produced.

Next, the sealed quartz glass ampoule is raised in temperature to 650 to 1000° C. at a rate of 10° C. to 20° C./hour in a melting furnace and then held for six to twelve hours. During the holding time, the quartz glass ampoule is turned upside down as necessary to stir the melt.

Subsequently, the quartz glass ampoule is taken out of the melting furnace and the melt is moved to the glass forming portion and rapidly cooled to room temperature, thus obtaining a chalcogenide glass material.

Since the chalcogenide glass material according to the present invention has excellent weather resistance and mechanical strength and is free of stria of 500 μm or more which may cause image distortion or disturbance, it is suitable as an optical element, such as a lens for focusing infrared light on an infrared sensor part of an infrared camera.

Examples

Hereinafter, the present invention will be described with reference to examples, but is not limited to the examples.

Tables 1 to 16 show Examples 1 to 180 according to the present invention and Comparative Examples 1 and 2.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Glass composition (% by mole) | Ge | | | 28.0 | | | | | | | 5.0 | | |
| | Ga | | | | | | | | | | | | |
| | Sb | | | 12.0 | | | | | | | 33.0 | | |
| | As | | | | | | | | | | | | |
| | S | | | | | | | | | | 61.0 | | |
| | Se | | | 60.0 | | | | | | | | | |
| | Te | | | | | | | | | | | | |
| | Bi | | | | | | | | | | 1.0 | | |
| | Sn | | | | | | | | | | | | |
| Glass transition point (° C.) | | | | 278 | | | | | | | 230 | | |
| Diameter of glass base material (mm) | | 15 | 15 | 15 | 15 | 21 | 30 | 15 | 15 | 15 | 15 | 21 | 30 |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 2

| | | Example | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Glass composition (% by mole) | Ge | | | 22.0 | | | | | | | 33.0 | | |
| | Ga | | | | | | | | | | | | |
| | Sb | | | | | | | | | | | | |

TABLE 2-continued

| | | \multicolumn{12}{c}{Example} |
|---|---|---|---|---|---|---|---|---|---|---|---|---|---|
| | | 13 | 14 | 15 | 16 | 17 | 18 | 19 | 20 | 21 | 22 | 23 | 24 |
| | As | | | 20.0 | | | | | | 12.0 | | | |
| | S | | | | | | | | | | | | |
| | Se | | | 58.0 | | | | | | 55.0 | | | |
| | Te | | | | | | | | | | | | |
| | Bi | | | | | | | | | | | | |
| | Sn | | | | | | | | | | | | |
| Glass transition point (° C.) | | | | 292 | | | | | | 368 | | | |
| Diameter of glass base material (mm) | | 15 | 15 | 15 | 15 | 21 | 30 | 15 | 15 | 15 | 15 | 21 | 30 |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 3

| | | \multicolumn{12}{c}{Example} |
|---|---|---|---|---|---|---|---|---|---|---|---|---|---|
| | | 25 | 26 | 27 | 28 | 29 | 30 | 31 | 32 | 33 | 34 | 35 | 36 |
| Glass composition (% by mole) | Ge | | | 30.0 | | | | | | 10.0 | | | |
| | Ga | | | | | | | | | | | | |
| | Sb | | | | | | | | | | | | |
| | As | | | 13.0 | | | | | | 40.0 | | | |
| | S | | | | | | | | | | | | |
| | Se | | | 32.0 | | | | | | 50.0 | | | |
| | Te | | | 25.0 | | | | | | | | | |
| | Bi | | | | | | | | | | | | |
| | Sn | | | | | | | | | | | | |
| Glass transition point (° C.) | | | | 275 | | | | | | 225 | | | |
| Diameter of glass base material (mm) | | 15 | 15 | 15 | 15 | 21 | 30 | 15 | 15 | 15 | 15 | 21 | 30 |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 4

| | | \multicolumn{12}{c}{Example} |
|---|---|---|---|---|---|---|---|---|---|---|---|---|---|
| | | 37 | 38 | 39 | 40 | 41 | 42 | 43 | 44 | 45 | 46 | 47 | 48 |
| Glass composition (% by mole) | Ge | | | | | | | | | | | | |
| | Ga | | | | | | | | | | | | |
| | Sb | | | | | | | | | | | | |
| | As | | | 40.0 | | | | | | 40.0 | | | |
| | S | | | | | | | | | 60.0 | | | |
| | Se | | | 60.0 | | | | | | | | | |
| | Te | | | | | | | | | | | | |
| | Bi | | | | | | | | | | | | |
| | Sn | | | | | | | | | | | | |
| Glass transition point (° C.) | | | | 185 | | | | | | 197 | | | |
| Diameter of glass base material (mm) | | 15 | 15 | 15 | 15 | 21 | 30 | 15 | 15 | 15 | 15 | 21 | 30 |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 5

| | | Example | | | | | | | | | | | |
|---|---|---|---|---|---|---|---|---|---|---|---|---|---|
| | | 49 | 50 | 51 | 52 | 53 | 54 | 55 | 56 | 57 | 58 | 59 | 60 |
| Glass composition (% by mole) | Ge | | | | | | | | | | | | |
| | Ga | | | 20.0 | | | | | | 8.2 | | | |
| | Sb | | | | | | | | | 27.7 | | | |
| | As | | | | | | | | | | | | |
| | S | | | | | | | | | 59.0 | | | |
| | Se | | | | | | | | | | | | |
| | Te | | | 80.0 | | | | | | | | | |
| | Bi | | | | | | | | | | | | |
| | Sn | | | | | | | | | 5.1 | | | |
| Glass transition point (° C.) | | | | 147 | | | | | | 239 | | | |
| Diameter of glass base material (mm) | | 15 | 15 | 15 | 15 | 21 | 30 | 15 | 15 | 15 | 15 | 21 | 30 |
| Diameter of chalcogenide glass material (mm) | | 3.0 | 5.0 | 7.0 | 9.0 | 11.0 | 13.0 | 3.0 | 5.0 | 7.0 | 9.8 | 11.0 | 13.0 |
| Striae | | ○ | ○ | ○ | ○ | ○ | ○ | ○ | ○ | ○ | ○ | ○ | ○ |

TABLE 6

| | | Example | | | | | | | | | | | |
|---|---|---|---|---|---|---|---|---|---|---|---|---|---|
| | | 61 | 62 | 63 | 64 | 65 | 66 | 67 | 68 | 69 | 70 | 71 | 72 |
| Glass composition (% by mole) | Ge | | | 28.0 | | | | | | | 5.0 | | |
| | Ga | | | | | | | | | | | | |
| | Sb | | | 12.0 | | | | | | | 33.0 | | |
| | As | | | | | | | | | | | | |
| | S | | | | | | | | | | 61.0 | | |
| | Se | | | 60.0 | | | | | | | | | |
| | Te | | | | | | | | | | | | |
| | Bi | | | | | | | | | | 1.0 | | |
| | Sn | | | | | | | | | | | | |
| Glass transition point (° C.) | | | | 278 | | | | | | | 230 | | |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 7

| | | Example | | | | | | | | | | | |
|---|---|---|---|---|---|---|---|---|---|---|---|---|---|
| | | 73 | 74 | 75 | 76 | 77 | 78 | 79 | 80 | 81 | 82 | 83 | 84 |
| Glass composition (% by mole) | Ge | | | 22.0 | | | | | | | 33.0 | | |
| | Ga | | | | | | | | | | | | |
| | Sb | | | | | | | | | | | | |
| | As | | | 20.0 | | | | | | | 12.0 | | |
| | S | | | | | | | | | | | | |
| | Se | | | 58.0 | | | | | | | 55.0 | | |
| | Te | | | | | | | | | | | | |
| | Bi | | | | | | | | | | | | |
| | Sn | | | | | | | | | | | | |
| Glass transition point (° C.) | | | | 292 | | | | | | | 368 | | |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 8

| | | Example | | | | | | | | | | | |
|---|---|---|---|---|---|---|---|---|---|---|---|---|---|
| | | 85 | 86 | 87 | 88 | 89 | 90 | 91 | 92 | 93 | 94 | 95 | 96 |
| Glass composition (% by mole) | Ge | | | | 30.0 | | | | | | 10.0 | | |
| | Ga | | | | | | | | | | | | |
| | Sb | | | | | | | | | | | | |
| | As | | | | 13.0 | | | | | | 40.0 | | |
| | S | | | | | | | | | | | | |
| | Se | | | | 32.0 | | | | | | 50.0 | | |
| | Te | | | | 25.0 | | | | | | | | |
| | Bi | | | | | | | | | | | | |
| | Sn | | | | | | | | | | | | |
| Glass transition point (° C.) | | | | | 275 | | | | | | 225 | | |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 9

| | | Example | | | | | | | | | | | |
|---|---|---|---|---|---|---|---|---|---|---|---|---|---|
| | | 97 | 98 | 99 | 100 | 101 | 102 | 103 | 104 | 105 | 106 | 107 | 108 |
| Glass composition (% by mole) | Ge | | | | | | | | | | | | |
| | Ga | | | | | | | | | | | | |
| | Sb | | | | | | | | | | | | |
| | As | | | | 40.0 | | | | | | 40.0 | | |
| | S | | | | | | | | | | 60.0 | | |
| | Se | | | | 60.0 | | | | | | | | |
| | Te | | | | | | | | | | | | |
| | Bi | | | | | | | | | | | | |
| | Sn | | | | | | | | | | | | |
| Glass transition point (° C.) | | | | | 185 | | | | | | 197 | | |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 10

| | | Example | | | | | | | | | | | |
|---|---|---|---|---|---|---|---|---|---|---|---|---|---|
| | | 109 | 110 | 111 | 112 | 113 | 114 | 115 | 116 | 117 | 118 | 119 | 120 |
| Glass composition (% by mole) | Ge | | | | | | | | | | | | |
| | Ga | | | | 20.0 | | | | | | 8.2 | | |
| | Sb | | | | | | | | | | 27.7 | | |
| | As | | | | | | | | | | | | |
| | S | | | | | | | | | | 59.0 | | |
| | Se | | | | | | | | | | | | |
| | Te | | | | 80.0 | | | | | | | | |
| | Bi | | | | | | | | | | | | |
| | Sn | | | | | | | | | | 5.1 | | |
| Glass transition point (° C.) | | | | | 147 | | | | | | 239 | | |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 11

| | | Example | | | | | | | | | | | |
|---|---|---|---|---|---|---|---|---|---|---|---|---|---|
| | | 121 | 122 | 123 | 124 | 125 | 126 | 127 | 128 | 129 | 130 | 131 | 132 |
| Glass composition (% by mole) | Ge | | | 28.0 | | | | | | 5.0 | | | |
| | Ga | | | | | | | | | | | | |
| | Sb | | | 12.0 | | | | | | 33.0 | | | |
| | As | | | | | | | | | | | | |
| | S | | | | | | | | | 61.0 | | | |
| | Se | | | 60.0 | | | | | | | | | |
| | Te | | | | | | | | | | | | |
| | Bi | | | | | | | | | 1.0 | | | |
| | Sn | | | | | | | | | | | | |
| Glass transition point (° C.) | | | | 278 | | | | | | 230 | | | |
| Inner diameter of stirring portion (mm) | | 15 | 15 | 15 | 15 | 21 | 30 | 15 | 15 | 15 | 15 | 21 | 30 |
| Inner diameter of forming portion (mm) | | 3.0 | 5.0 | 7.0 | 9.0 | 11.0 | 13.0 | 3.0 | 5.0 | 7.0 | 9.0 | 11.0 | 13.0 |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 12

| | | Example | | | | | | | | | | | |
|---|---|---|---|---|---|---|---|---|---|---|---|---|---|
| | | 133 | 134 | 135 | 136 | 137 | 138 | 139 | 140 | 141 | 142 | 143 | 144 |
| Glass composition (% by mole) | Ge | | | 22.0 | | | | | | 33.0 | | | |
| | Ga | | | | | | | | | | | | |
| | Sb | | | | | | | | | | | | |
| | As | | | 20.0 | | | | | | 12.0 | | | |
| | S | | | | | | | | | | | | |
| | Se | | | 58.0 | | | | | | 55.0 | | | |
| | Te | | | | | | | | | | | | |
| | Bi | | | | | | | | | | | | |
| | Sn | | | | | | | | | | | | |
| Glass transition point (° C.) | | | | 292 | | | | | | 368 | | | |
| Inner diameter of stirring portion (mm) | | 15 | 15 | 15 | 15 | 21 | 30 | 15 | 15 | 15 | 15 | 21 | 30 |
| Inner diameter of forming portion (mm) | | 3.0 | 5.0 | 7.0 | 9.0 | 11.0 | 13.0 | 3.0 | 5.0 | 7.0 | 9.0 | 11.0 | 13.0 |
| Diameter of chalcogenide glass material (mm) | | 3.0 | 5.0 | 7.0 | 9.0 | 11.0 | 13.0 | 3.0 | 5.0 | 7.0 | 9.0 | 11.0 | 13.0 |
| Striae | | ○ | ○ | ○ | ○ | ○ | ○ | ○ | ○ | ○ | ○ | ○ | ○ |

TABLE 13

| | | Example | | | | | | | | | | | |
|---|---|---|---|---|---|---|---|---|---|---|---|---|---|
| | | 145 | 146 | 147 | 148 | 149 | 150 | 151 | 152 | 153 | 154 | 155 | 156 |
| Glass composition (% by mole) | Ge | | | 30.0 | | | | | | 10.0 | | | |
| | Ga | | | | | | | | | | | | |
| | Sb | | | | | | | | | | | | |
| | As | | | 13.0 | | | | | | 40.0 | | | |
| | S | | | | | | | | | | | | |
| | Se | | | 32.0 | | | | | | 50.0 | | | |

TABLE 13-continued

|  |  | Example |  |  |  |  |  |  |  |  |  |  |  |
|---|---|---|---|---|---|---|---|---|---|---|---|---|---|
|  |  | 145 | 146 | 147 | 148 | 149 | 150 | 151 | 152 | 153 | 154 | 155 | 156 |
|  | Te |  |  |  | 25.0 |  |  |  |  |  |  |  |  |
|  | Bi |  |  |  |  |  |  |  |  |  |  |  |  |
|  | Sn |  |  |  |  |  |  |  |  |  |  |  |  |
| Glass transition point (° C.) |  |  |  |  | 275 |  |  |  |  |  | 225 |  |  |
| Inner diameter of stirring portion (mm) |  | 15 | 15 | 15 | 15 | 21 | 30 | 15 | 15 | 15 | 15 | 21 | 30 |
| Inner diameter of forming portion (mm) |  | 3.0 | 5.0 | 7.0 | 9.0 | 11.0 | 13.0 | 3.0 | 5.0 | 7.0 | 9.0 | 11.0 | 13.0 |
| Diameter of chalcogenide glass material (mm) |  | 3.0 | 5.0 | 7.0 | 9.0 | 11.0 | 13.0 | 3.0 | 5.0 | 7.0 | 9.0 | 11.0 | 13.0 |
| Striae |  | ○ | ○ | ○ | ○ | ○ | ○ | ○ | ○ | ○ | ○ | ○ | ○ |

TABLE 14

|  |  | Example |  |  |  |  |  |  |  |  |  |  |  |
|---|---|---|---|---|---|---|---|---|---|---|---|---|---|
|  |  | 157 | 158 | 159 | 160 | 161 | 162 | 163 | 164 | 165 | 166 | 167 | 168 |
| Glass composition (% by mole) | Ge |  |  |  |  |  |  |  |  |  |  |  |  |
|  | Ga |  |  |  |  |  |  |  |  |  |  |  |  |
|  | Sb |  |  |  |  |  |  |  |  |  |  |  |  |
|  | As |  |  |  | 40.0 |  |  |  |  |  | 40.0 |  |  |
|  | S |  |  |  |  |  |  |  |  |  | 60.0 |  |  |
|  | Se |  |  |  | 60.0 |  |  |  |  |  |  |  |  |
|  | Te |  |  |  |  |  |  |  |  |  |  |  |  |
|  | Bi |  |  |  |  |  |  |  |  |  |  |  |  |
|  | Sn |  |  |  |  |  |  |  |  |  |  |  |  |
| Glass transition point (° C.) |  |  |  |  | 195 |  |  |  |  |  | 197 |  |  |
| Inner diameter of stirring portion (mm) |  | 15 | 15 | 15 | 15 | 21 | 30 | 15 | 15 | 15 | 15 | 21 | 30 |
| Inner diameter of forming portion (mm) |  | 3.0 | 5.0 | 7.0 | 9.0 | 11.0 | 13.0 | 3.0 | 5.0 | 7.0 | 9.0 | 11.0 | 13.0 |
| Diameter of chalcogenide glass material (mm) |  | 3.0 | 5.0 | 7.0 | 9.0 | 11.0 | 13.0 | 3.0 | 5.0 | 7.0 | 9.0 | 11.0 | 13.0 |
| Striae |  | ○ | ○ | ○ | ○ | ○ | ○ | ○ | ○ | ○ | ○ | ○ | ○ |

TABLE 15

|  |  | Example |  |  |  |  |  |  |  |  |  |  |  |
|---|---|---|---|---|---|---|---|---|---|---|---|---|---|
|  |  | 169 | 170 | 171 | 172 | 173 | 174 | 175 | 176 | 177 | 178 | 179 | 180 |
| Glass composition (% by mole) | Ge |  |  |  |  |  |  |  |  |  |  |  |  |
|  | Ga |  |  |  | 20.0 |  |  |  |  |  | 8.2 |  |  |
|  | Sb |  |  |  |  |  |  |  |  |  | 27.7 |  |  |
|  | As |  |  |  |  |  |  |  |  |  |  |  |  |
|  | S |  |  |  |  |  |  |  |  |  | 59.0 |  |  |
|  | Se |  |  |  |  |  |  |  |  |  |  |  |  |
|  | Te |  |  |  | 80.0 |  |  |  |  |  |  |  |  |
|  | Bi |  |  |  |  |  |  |  |  |  |  |  |  |
|  | Sn |  |  |  |  |  |  |  |  |  | 5.1 |  |  |

TABLE 15-continued

| | Example | | | | | | | | | | | |
|---|---|---|---|---|---|---|---|---|---|---|---|---|
| | 169 | 170 | 171 | 172 | 173 | 174 | 175 | 176 | 177 | 178 | 179 | 180 |
| Glass transition point (° C.) | | | 147 | | | | | | 239 | | | |
| Inner diameter of stirring portion (mm) | 15 | 15 | 15 | 15 | 21 | 30 | 15 | 15 | 15 | 15 | 21 | 30 |
| Inner diameter of forming portion (mm) | 3.0 | 5.0 | 7.0 | 9.0 | 11.0 | 13.0 | 3.0 | 5.0 | 7.0 | 9.0 | 11.0 | 13.0 |
| Diameter of chalcogenide glass material (mm) | 3.0 | 5.0 | 7.0 | 9.0 | 11.0 | 13.0 | 3.0 | 5.0 | 7.0 | 9.0 | 11.0 | 13.0 |
| Striae | ○ | ○ | ○ | ○ | ○ | ○ | ○ | ○ | ○ | ○ | ○ | ○ |

TABLE 16

| | | Comparative Example | |
|---|---|---|---|
| | | 1 | 2 |
| Glass composition (% by mole) | Ge | 5.0 | 4.0 |
| | Ga | | |
| | Sb | 33.0 | 4.0 |
| | As | | |
| | S | 61.0 | |
| | Se | | 92.0 |
| | Te | | |
| | Bi | 1.0 | |
| | Sn | | |
| Glass transition point (° C.) | | 230 | 248 |
| Diameter of glass base material (mm) | | — | 15 |
| Diameter of chalcogenide glass material (mm) | | 5.0 | 5.0 |
| Striae | | x | x |

Samples in Examples 1 to 60 and a sample in Comparative Example 2 were produced in the following manner. Raw materials were mixed to give each composition shown in the tables, thus obtaining a raw material batch. Next, a 15-30 mm inner diameter quartz glass ampoule washed in pure water was evacuated with the application of heat, the raw material batch was then put into the quartz glass ampoule, and the quartz glass ampoule was sealed with an oxygen burner while being evacuated. The sealed quartz glass ampoule was raised in temperature to 650 to 1000° C. at a rate of 10 to 20° C./hour in a melting furnace and then held for six to twelve hours. During the holding time, the quartz glass ampoule was turned upside down every two hours to stir the melt. Thereafter, the quartz glass ampoule was taken out of the melting furnace and rapidly cooled to room temperature, thus obtaining a columnar glass base material having a diameter shown in the table.

The obtained glass base material was heated to a temperature 30 to 50° C. higher than the glass transition point in a nitrogen atmosphere and drawn by a redraw process, thus obtaining a columnar chalcogenide glass material having a diameter shown in the table.

Samples in Examples 61 to 120 were produced in the following manner. Raw materials were mixed to give each composition shown in the tables, thus obtaining a raw material batch. Next, a 15-50 mm inner diameter quartz glass ampoule washed in pure water was evacuated with the application of heat, the raw material batch was then put into the quartz glass ampoule, and the quartz glass ampoule was sealed with an oxygen burner while being evacuated. The sealed quartz glass ampoule was raised in temperature to 650 to 1000° C. at a rate of 10 to 20° C./hour in a melting furnace and then held for six to twelve hours. During the holding time, the quartz glass ampoule was turned upside down every two hours to stir the melt. Thereafter, the quartz glass ampoule was taken out of the melting furnace, a portion thereof was cut in a nitrogen atmosphere, and the melt was poured into a carbon-made mold and rapidly cooled to room temperature, thus obtaining a columnar chalcogenide glass material having a diameter shown in the table.

Samples in Examples 121 to 180 were produced in the following manner. Raw materials were mixed to give each composition shown in the tables, thus obtaining a raw material batch. Next, a quartz glass ampoule washed in pure water was evacuated with the application of heat, the raw material batch was then put into the quartz glass ampoule, and the quartz glass ampoule was sealed with an oxygen burner while being evacuated. The sealed quartz glass ampoule having an inner diameter of a stirring portion and an inner diameter of a forming portion each shown in the table was raised in temperature to 650 to 1000° C. at a rate of 10 to 20° C./hour in a melting furnace and then held for six to twelve hours. During the holding time, the quartz glass ampoule was turned upside down every two hours to stir the melt. Thereafter, the quartz glass ampoule was taken out of the melting furnace and the melt was moved to the forming portion and rapidly cooled to room temperature, thus obtaining a columnar chalcogenide glass material having a diameter shown in the table.

Comparative Example 1 was produced in the following manner. Raw materials were mixed to give a composition shown in the table, thus obtaining a raw material batch. Next, a 5 mm inner diameter quartz glass ampoule washed in pure water was evacuated with the application of heat, the raw material batch was then put into the quartz glass ampoule, and the quartz glass ampoule was sealed with an oxygen burner while being evacuated. The sealed quartz glass ampoule was raised in temperature to 800° C. at a rate of 15° C./hour in a melting furnace and then held for ten hours. During the holding time, the quartz glass ampoule was turned upside down every two hours to stir the melt. Thereafter, the quartz glass ampoule was taken out of the melting furnace and rapidly cooled to room temperature, thus obtaining a chalcogenide glass material.

The obtained samples were measured or evaluated in terms of glass transition point and striae.

The glass transition point was measured with a TMA (thermo-mechanical analyzer).

Striae were evaluated in the following manner. The inside of each of the obtained samples was observed by a shadow graph method using infrared light with a wavelength of 1 μm. Samples in which striae with a length of 500 μm or more were observed are indicated by a "circle" sign, whereas samples in which no stria with a length of 500 μm or more was observed are indicated by a "cross" sign. FIG. 1 shows a photograph of the inside of the sample in Example 1. FIG. 2 shows a photograph of the inside of the sample in Comparative Example 1.

No stria with a length of 500 μm or more was observed in the samples in Examples 1 to 180 and, therefore, these samples exhibited excellent homogeneity. In addition, since these samples were unpolished, they can be considered to have excellent weather resistance and mechanical strength. On the other hand, striae with a length of 500 μm or more were observed in the samples in Comparative Examples 1 and 2 and, therefore, these samples exhibited poor homogeneity.

INDUSTRIAL APPLICABILITY

The chalcogenide glass material according to the present invention is suitable as an optical element, such as a lens for focusing infrared light on an infrared sensor part of an infrared camera.

The invention claimed is:

1. A method for producing a chalcogenide glass material, the method comprising:
    drawing only a glass base material containing, in terms of % by mole, 40 to 90% S+Se+Te and 20 to 35% Sb+As by a redraw process, wherein
    a diameter of the chalcogenide glass material after drawing is 1 mm or more and 15 mm or less, and
    a cross section of the chalcogenide glass material after drawing contains no pores or air holes.

2. The method for producing a chalcogenide glass material according to claim 1, wherein a drawing temperature is equal to or lower than a glass transition point of the chalcogenide glass material plus 100° C.

3. The method for producing a chalcogenide glass material according to claim 1, wherein the drawing is performed in a vacuum or in an inert atmosphere.

4. The method for producing a chalcogenide glass material according to claim 1, wherein the chalcogenide glass material after drawing consists of glass material.

* * * * *